United States Patent
Harkness (10) Patent No.: US 9,190,178 B2
(45) Date of Patent: Nov. 17, 2015

(54) METHOD FOR REFUELING A NUCLEAR REACTOR HAVING AN INSTRUMENTATION PENETRATION FLANGE

(71) Applicant: WESTINGHOUSE ELECTRIC COMPANY LLC, Cranberry Township, PA (US)

(72) Inventor: Alexander W. Harkness, Gibsonia, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 0 days.

(21) Appl. No.: 14/709,813

(22) Filed: May 12, 2015

(65) Prior Publication Data
US 2015/0287484 A1    Oct. 8, 2015

Related U.S. Application Data

(62) Division of application No. 13/742,392, filed on Jan. 16, 2013, now Pat. No. 9,064,607.

(51) Int. Cl.
G21C 19/10 (2006.01)
G21C 5/10 (2006.01)

(52) U.S. Cl.
CPC . G21C 19/10 (2013.01); G21C 5/10 (2013.01)

(58) Field of Classification Search
CPC .................................. G21C 19/10; G21C 5/10
USPC .......... 376/205, 254, 262, 263, 264, 268, 271
See application file for complete search history.

(56) References Cited

U.S. PATENT DOCUMENTS

| | | | |
|---|---|---|---|
| 3,158,543 A * | 11/1964 | Sherman et al. | 376/203 |
| 3,397,114 A | 8/1968 | Deighton | |
| 4,557,891 A * | 12/1985 | Gibbons et al. | 376/353 |
| 4,818,476 A * | 4/1989 | Gasparro | 376/205 |
| 5,278,876 A | 1/1994 | Sawabe | |
| 5,606,582 A * | 2/1997 | Bergamaschi | 376/336 |
| 2006/0146976 A1* | 7/2006 | Emin | 376/328 |
| 2013/0287157 A1* | 10/2013 | Conway et al. | 376/203 |
| 2013/0336442 A1* | 12/2013 | Evans et al. | 376/384 |

* cited by examiner

Primary Examiner — Jack W Keith
Assistant Examiner — Daniel Wasil
(74) Attorney, Agent, or Firm — Joseph C. Spadacene; Westinghouse Electric Company LLC (57) ABSTRACT

A method for retracting in-core instrument thimble tubes from the reactor core prior to refueling a nuclear reactor with top mounted instrumentation. The apparatus includes a penetration flange interposed between the head flange and the reactor vessel flange through which the instrumentation cabling passes. The penetration flange is connected to the upper internals and is raised relative thereto to retract instrumentation thimbles from the core prior to removal of the upper internals from the reactor vessel for refueling. The penetration flange is removed from the vessel with the upper internals.

3 Claims, 12 Drawing Sheets

METHOD FOR REFUELING A NUCLEAR REACTOR HAVING AN INSTRUMENTATION PENETRATION FLANGE

CROSS REFERENCE TO RELATED APPLICATION

This application is a divisional application and claims priority to U.S. patent application Ser. No. 13/742,392, filed Jan. 16, 2013, entitled METHOD AND APPARATUS FOR REFUELING A NUCLEAR REACTOR HAVING AN INSTRUMENTATION PENETRATION FLANGE, and is related to U.S. application Ser. No. 13/457,683, filed Apr. 27, 2012, entitled INSTRUMENTATION AND CONTROL PENETRATION FLANGE FOR PRESSURIZED WATER REACTOR.

BACKGROUND

1. Field

This invention relates in general to nuclear reactor systems, and in particular to nuclear reactors with instrumentation penetrations through an upper portion of the reactor vessel, below the reactor closure head 2. Description of Related Art A pressurized water reactor has a large number of elongated fuel assemblies mounted within an upright reactor vessel. Pressurized coolant is circulated through the fuel assemblies to absorb heat generated by nuclear reactions in fissionable material contained in the fuel assemblies. The primary side of such a nuclear reactor power generating system which is cooled with water under pressure comprises an enclosed circuit which is isolated from and in heat exchange relationship with a secondary circuit for the production of useful energy. The primary side comprises the reactor vessel enclosing a core internal structure that supports the plurality of fuel assemblies containing the fissile material, the primary circuit within heat exchange steam generators, the inner volume of a pressurizer, pumps and pipes for circulating pressurized water; the pipes connecting each of the steam generators and pumps to the reactor vessel independently. In conventional nuclear plants of that type each of the parts of the primary side comprising the steam generator, a pump and a system of pipes which are connected to the reactor vessel form a loop of the primary side.

Figure 1:
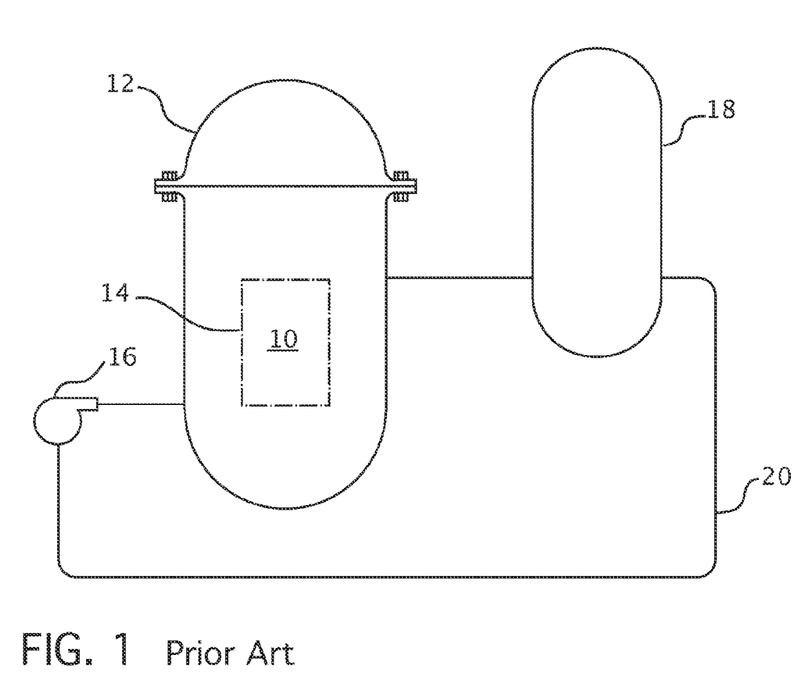
FIG. 1 is a simplified schematic of a conventional nuclear reactor system to which the embodiments described hereafter can be applied.

For the purpose of illustration, FIG. 1 shows a simplified conventional nuclear reactor primary system, including a generally cylindrical pressure vessel 10 having a closure head 12 enclosing a nuclear core 14. A liquid coolant, such as water or borated water, is pumped into the vessel 10 by pump 16 through the core 14 where heat energy is absorbed and is discharged to a heat exchanger 18, typically referred to as a steam generator, in which heat is transferred to a utilization circuit (not shown), such as a steam driven turbine generator. The reactor coolant is then returned to the pump 16, completing the primary loop. Typically, a plurality of the above-described loops are connected to a single reactor 10 by reactor coolant piping 20.

Figure 2:
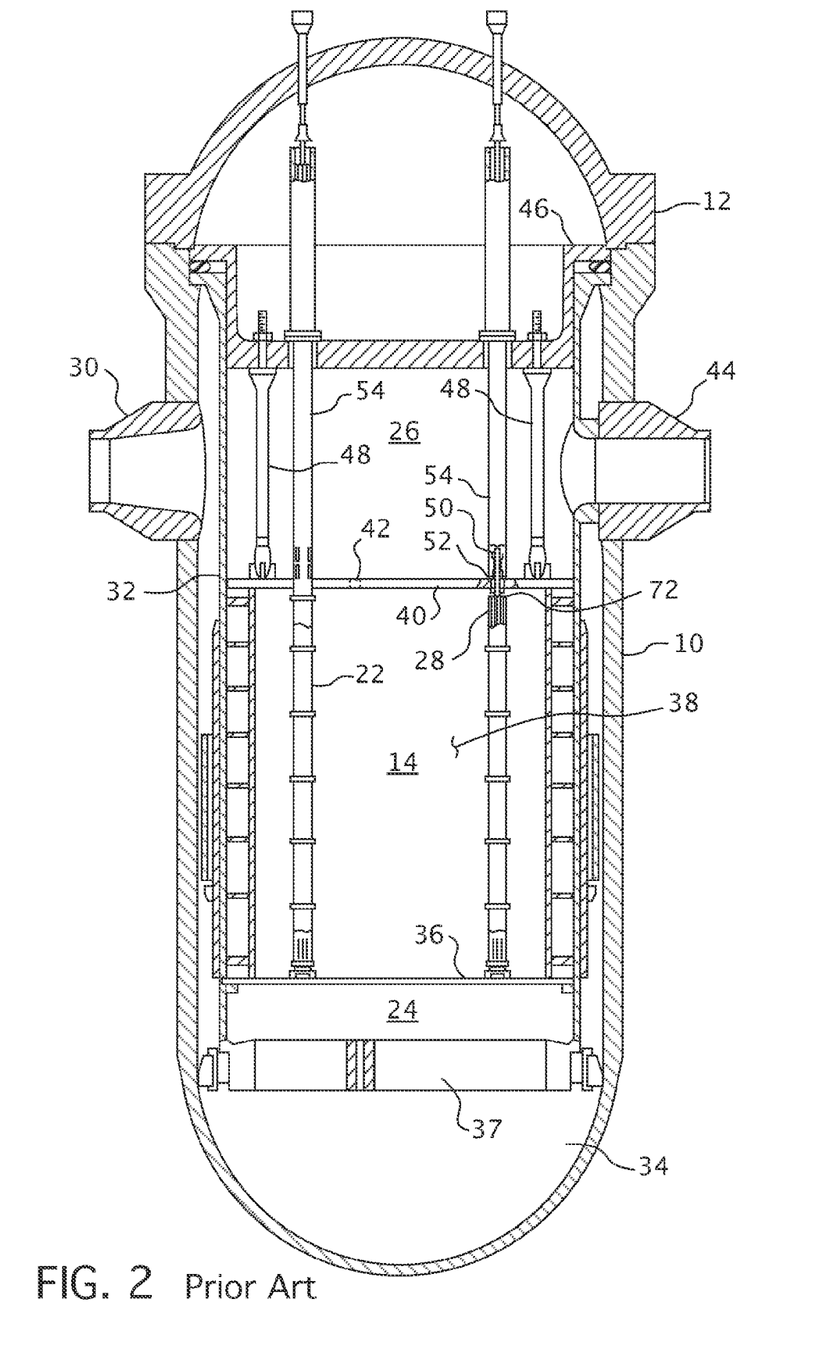
FIG. 2 is an elevational view, partially in section, of a nuclear reactor vessel and internal components to which the embodiments described hereafter can be applied.

An exemplary conventional reactor design is shown in more detail in FIG. 2. In addition to the core 14 comprised of a plurality of parallel, vertical co-extending fuel assemblies 22, for the purpose of this description, the other vessel internal structure can be divided into the lower internals 24 and the upper internals 26. In conventional designs, the lower internals function to support, align and guide core components and instrumentation as well as direct flow within the vessel. The upper internals restrain or provide a secondary restraint for the fuel assemblies 22 (only two of which are shown for simplicity in FIG. 2), and support and guide instrumentation and components, such as control rods 28. In the exemplary reactor shown in FIG. 2, coolant enters the reactor vessel through one or more inlet nozzles 30, flows down through an annulus between the reactor vessel and the core barrel 32, is turned 1800 in a lower plenum 34, passes upwardly to a lower support plate 37 and a lower core plate 36 upon which the fuel assemblies are seated and through and about the fuel assemblies 22. In some designs, the lower support plate 37 and the lower core plate 36 are replaced by a single structure, a lower core support plate having the same elevation as 37. The coolant flow through the core and surrounding area 38 is typically large on the order of 400,000 gallons per minute at a velocity of approximately 20 feet per second. The resulting pressure drop and frictional forces tend to cause the fuel assemblies to rise, which movement is restrained by the upper internals, including a circular upper core plate 40. Coolant exiting the core 14 flows along the underside of the upper core plate and upwardly through a plurality of perforations 42. The coolant then flows upwardly and radially to one or more outlet nozzles 44.

The upper internals 26 can be supported from the vessel or the vessel head and include an upper support assembly 46. Loads are transmitted between the upper support assembly 46 and the upper core plate 40, primarily by a plurality of support columns 48. A support column is aligned above a selected fuel assembly 22 and perforations 42 in the upper core plate 40.

Rectilinearly moveable control rods 28 which typically include a drive shaft or drive rod 50 and spider assembly 52 of neutron poison rods, are guided through the upper internals 26 and into aligned fuel assemblies 22 by control rod guide tubes 54. The guide tubes are fixedly joined to the upper support assembly 46 and the top of the upper core plate 40. The support column 48 arrangement assists in retarding guide tube deformation under accident conditions which could detrimentally affect control rod insertion capability.

To control the fission process, a number of control rods 28 are reciprocally moveable in guide thimbles located at predetermined positions in the fuel assemblies 22. Specifically, a control rod mechanism positioned above the top nozzle of the fuel assembly supports a plurality of control rods. The control rod mechanism (also known as a rod cluster control assembly) has an internally threaded cylindrical hub member with a plurality of radially extending flukes or arms that form the spider 52 previously noted with regard to FIG. 2. Each arm is interconnected to a control rod 28 such that the control rod assembly mechanism 72 is operable to move the control rods 28 vertically within guide thimbles within the fuel assemblies to thereby control the fission process in the fuel assembly 22, under the motive power of the control rod drive shaft 50 which is coupled to the control rod mechanism hub, all in a well-known manner.

The upper internals 26 also have a number of in-core instrumentation that extend down through axial passages within the support columns 48 and into instrumentation thimbles generally, centrally located within the fuel assemblies. The in-core instrumentation typically includes a thermocouple for measuring the coolant core exit temperature and axially disposed neutron detectors for monitoring the axial and radial profile of neutron activity within the core.

Nuclear power plants, which employ light water reactors require periodic outages for refueling of the reactor. New fuel assemblies are delivered to the plant and temporarily stored in a fuel storage building, along with used fuel assemblies which may have been previously removed from the reactor. During a refueling outage, a portion of the fuel assemblies in the reactor are removed from the reactor to the fuel storage building. A second portion of the fuel assemblies are moved from one support location in the reactor to another core support location in the reactor. New fuel assemblies are moved from the fuel storage building into the reactor to replace those fuel assemblies which were removed. These movements are done in accordance with a detailed sequence plan so that each fuel assembly is placed in a specific location in accordance with an overall refueling plan prepared by the reactor core designer. In conventional reactors, the removal of the reactor internal components necessary to access the fuel and the movement of new and old fuel between the reactor and the spent fuel pool in the fuel storage building is performed under water to shield the plant maintenance personnel. This is accomplished by raising the water level in a refueling cavity and canal that is integral to the plant's building structure. The water level of more than 20 feet provides shielding for the movement of the reactor internal structures and the fuel assemblies.

Refueling activities are often on a critical path for returning the nuclear plant to power operation, therefore, the speed of these operations is an important economic consideration for the power plant owner. Furthermore, the plant equipment and fuel assemblies are expensive and care must be taken not to cause damage or unnecessary radiation exposure due to improper handling of the reactor components that have to be removed to access the fuel assemblies, the fuel assemblies or fuel transfer equipment. The precision of these operations is also important since the safe and economical operation of the reactor core depends upon each fuel assembly being in its proper location. A typical pressured water reactor needs to be refueled every eighteen to twenty-four months.

Commercial power plants employing the conventional designs illustrated in FIGS. 1 and 2 are typically on the order of 1,100 megawatts or more. More recently, Westinghouse Electric Company LLC has proposed a small modular reactor in the 200 megawatt class. The small modular reactor is an integral pressurized water reactor with all primary loop components located inside the reactor vessel. The reactor vessel is surrounded by a compact, high pressure containment. Due to both the limited space within the containment and the low cost requirement for integral pressurized light water reactors, the overall number of auxiliary systems needs to be minimized without compromising safety or functionality. For example, the compact, high pressure containment associated with the design of some small modular reactors does not allow for the incorporation of a large floodable cavity above the reactor vessel in which the transferred components can be shielded. Furthermore, in most traditional pressurized water reactors, the in-core instrumentation is retracted from the core prior to refueling. This is done by breaking primary pressure boundary seals and pulling the instrumentation through a conduit tube. This procedure is straight forward in plants with bottom mounted instrumentation since the conduit just extends from the bottom of the reactor vessel to a seal table located in a room separated from the reactor. In plants with top mounted instrumentation, this procedure is much more challenging because of the upper internal structure. This is further complicated when top mounted instrumentation is considered for use in an integral pressurized water reactor of a small modular reactor. Top mounted instrumentation is preferred in plants that use a severe accident mitigation strategy commonly referred to as in-vessel retention. This strategy requires that there are no penetrations in the lower portion of the reactor vessel.

Accordingly, it is an object of this invention to provide a method and apparatus for nuclear plants that employ top mounted instrumentation that will facilitate access to the core for refueling.

It is a further object of this invention to provide such a method and apparatus that will facilitate removal of the top mounted instrumentation as an integral part of the upper internals structure within the reactor vessel.

It is an additional object of this invention to provide such a method and apparatus wherein the instrumentation penetrations through the vessel are removed from the vessel as an integral part of the upper internals package.

SUMMARY

These and other objects are achieved by a nuclear reactor having an elongated reactor vessel enclosed at a lower end and having an open upper end on which an annular flange is formed and a central axis extending along an elongated dimension. The reactor vessel has a removable head having an annular portion on an underside of the head that is machined to form a sealing surface with the annular vessel flange. A first removable annular seal ring, sized to seat on the reactor vessel flange between the flange and the sealing surface on the underside of the reactor vessel head, with the seal ring being interposed between the sealing surface on the underside of the vessel head and the flange on the reactor vessel and having a thickness sized to sealably accommodate one or more radial passages through which one or more instrument conduits pass from outside of the reactor vessel to an interior thereof to communicate instrumentation signals out of the core of the nuclear reactor, the core having a plurality of fuel assemblies. An upper internals package supported above the core within the reactor vessel has a plurality of hollow support columns respectively having a substantially vertical passage therethrough, that extend through and between an upper core plate and an upper support plate of the upper internals package, the passage through the upper core plate being aligned with a corresponding instrument thimble within one of the fuel assemblies. A plurality of hollow tubes are fixedly connected to the first removable annular seal ring, with each of the hollow tubes being slidable mounted within the passage of one of the support columns with at least one of the instrument conduits extending axially through the hollow tube into the corresponding support column. Each of the hollow tubes is slidably mounted within the passage of one of the support columns and moveable between a fully inserted position and a fully extended position wherein in the fully inserted position, the instrument conduit enters the instrument thimble and in the fully extended position, the instrument conduit is withdrawn from the core.

Preferably, a lower end of the hollow tube is captured within the passage of the support column. In one embodiment, at approximately a lower end of travel of the hollow tube within the support column passage, the walls of the support column passage thicken to provide a tighter fit than experienced between an intermediate axial extent within the support column passage between the fully inserted position and the fully extended position. Desirably, a lower end of the hollow tube is narrower than an intermediate axial portion of the hollow tube.

In another embodiment, wherein the first removable annular seal ring extends radially between an approximate extent of an outer wall of the reactor vessel and a wall of the upper internals package, including a second removable annular seal ring positioned below the first removable annular seal ring between the first removable annular seal ring and the reactor vessel flange and having substantially the same radial extent as the first removable seal ring. A radially outwardly extending abutting surface on each of the first and second seal ring are sealed to each other by at least one o-ring and an axially directed primary coolant passage extends and is substantially aligned through each of the first and second seal ring. An inwardly extending abutting surface on each of the first and second seal ring extends on an opposite side of the primary coolant passage from the o-ring and is sealed by a "T" shaped ring with the web of the "T" extending between the inwardly abutting surfaces. Preferably, the web of the "T" is secured by a fastener attached to one of the inwardly extending abutting surfaces and passing through a clearance hole in the web. In one embodiment the clearance hole is slotted to permit thermal expansion. Desirably, the "T" shaped ring is constructed from a material that upon heat up of the nuclear reactor expands faster than the material the first and second removable annular seal rings are constructed from. Preferably, the first and second removable annular seal rings are constructed from carbon steel and the "T" shaped ring is constructed from stainless steel.

In another embodiment, the first removable annular seal ring extends radially between approximately an extent of an outer wall of the reactor vessel and a wall of the upper internals package and the nuclear reactor further includes a second removable annular seal ring positioned below the first removable annular seal ring between the first removable annular seal ring and the reactor vessel flange and has substantially the same radial extent as the first removable annular seal ring. A radially outwardly extending abutting surface on each of the first and second seal ring is sealed to each other by at least two radially spaced O-rings and a first leak off channel extends from between the at least two radially spaced O-rings to a collection reservoir which is connected to a second leak-off channel extending from between abutting surfaces on the second removable annular seal ring and the reactor vessel flange.

In still another embodiment, the hollow tube is supported by a substantially horizontally extending grid structure that is connected to the first removable annular seal ring. Preferably, the first removable annular seal ring is configured so that raising the first removable annular seal ring raises the grid structure and raises the hollow tube from within the corresponding support column.

The invention also contemplates a method of refueling the nuclear reactor described above including the step of removing the reactor head from the first removable annular seal ring. The first removable annular seal ring is then raised to an elevation that withdraws the instrument conduit from the core. Next, the method withdraws the upper internals package, including the first removable annular seal ring in the raised position, as a single unit, out of the reactor vessel to a storage location. The method then refuels the core. Preferably, after the refueling step, the method maintains the first removable annular seal ring in the raised position and lowers the upper internals package into the reactor vessel. The upper internals package is then supported above the core and the first removable annular seal ring is lowered on top of the reactor vessel flange, simultaneously lowering the hollow tubes within the corresponding support columns to lower the instrument conduits into the corresponding instrument thimbles in the fuel assemblies. The reactor vessel head is then replaced on the reactor vessel flange.

In a further embodiment, the first removable annular seal ring extends radially between an approximate extent of an outer wall of the reactor vessel and a wall of the upper internals package, including a second removable annular seal ring positioned below the first removable annular seal ring between the first removable annular seal ring and the reactor vessel flange. The second removable annular seal ring has substantially the same radial extent as the first removable annular seal ring and is fixedly connected to the wall of the upper internals package. In this latter embodiment of the method, the step of withdrawing the upper internals package includes the step of removing the second removable annular seal ring from the reactor vessel flange as part of the upper internals package.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENT

Figure 3:
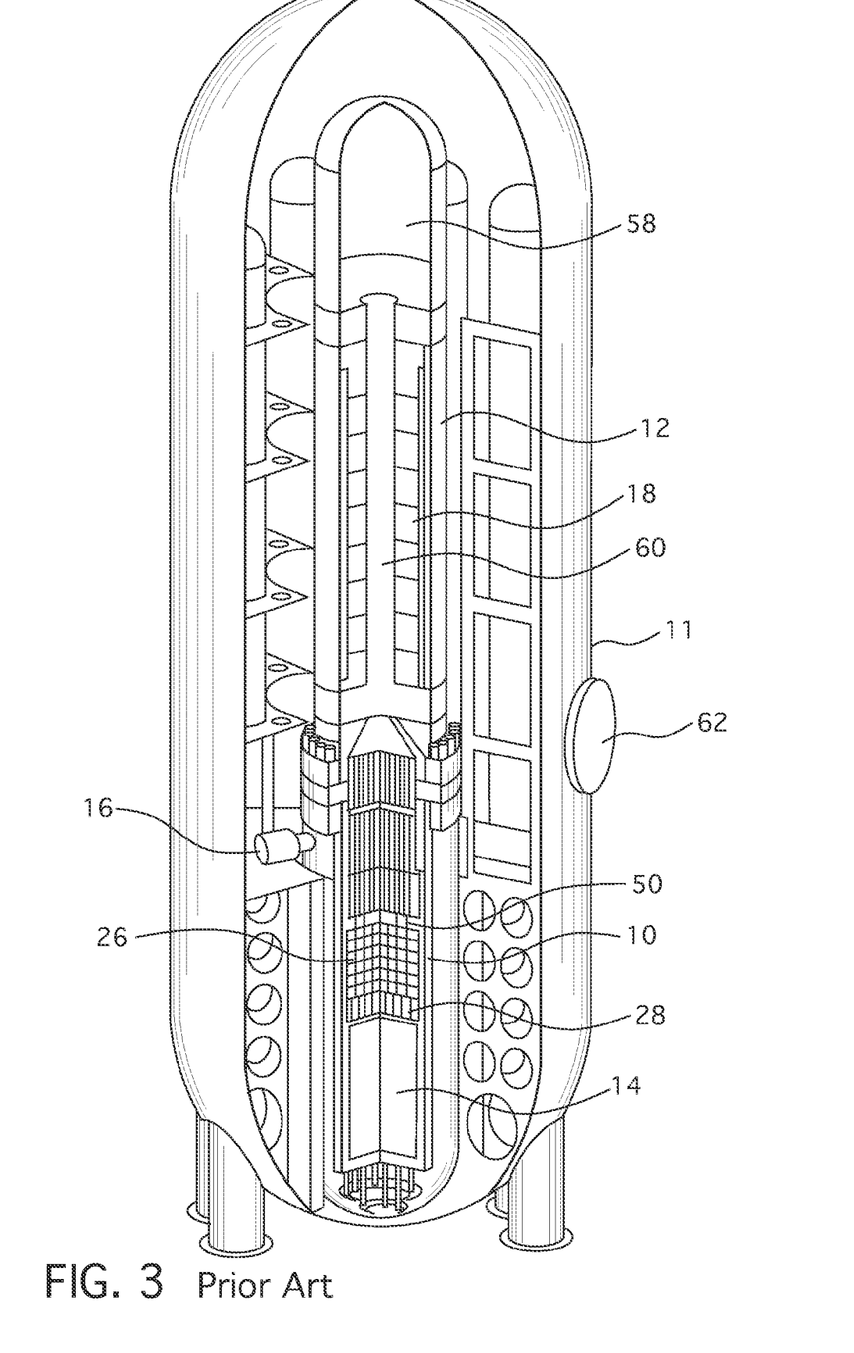
FIG. 3 is a perspective view, partially cut away, showing a small modular reactor system.
Figure 4:
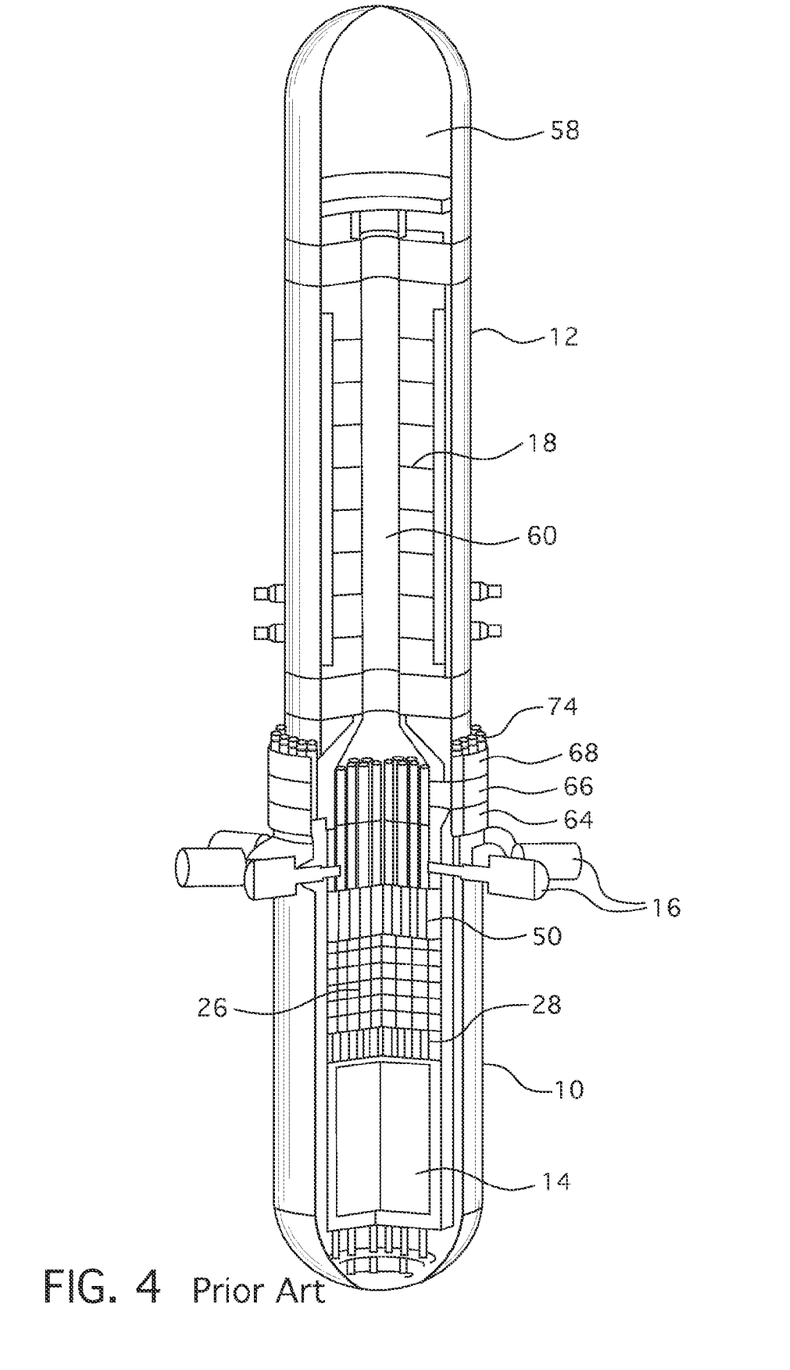
FIG. 4 is an enlarged view of the reactor vessel shown in FIG. 3.

FIGS. 3 and 4 illustrate a small modular reactor design available from the Westinghouse Electric Company LLC, Cranberry Township, Pennsylvania, to which the apparatus and method concepts of this invention can be applied. Though it should be appreciated that the invention can also be applied to a conventional pressurized water reactor design such as the one illustrated in FIGS. 1 and 2, as will be further explained hereafter. FIG. 3 shows a perspective view of the reactor containment 11, partially cut away to show the pressure vessel 10 and its internal components. FIG. 4 is an enlarged view of the pressure vessel shown in FIG. 3. The pressurizer 58 is common to most pressurized water reactor designs, though not shown in FIG. 1, and is typically included in one loop to maintain the system's pressure. In the small modular reactor design illustrated in FIGS. 3 and 4, the pressurizer 58 is integrated into the upper portion of the reactor vessel head 12 and eliminates the need for a separate component. It should be appreciated that the same reference characters are employed for corresponding components among the several figures. A hot leg riser 60 directs primary coolant from the core 14 to a steam generator 18 which surrounds the hot leg riser 60. A number of cooling pumps 16 are circumferentially spaced around the reactor vessel 10 at an elevation near the upper end of the upper internals 26. The reactor coolant pumps 16 are horizontally mounted axial flow canned motor pumps. The reactor core 14 and the upper internals 26, except for their size, are substantially the same as the corresponding components previously described with regards to FIGS. 1 and 2. From the foregoing, it should be appreciated that employing the traditional refueling method by flooding the reactor well above the area of the vessel flange 64 and transferring the fuel assemblies under water to a spent fuel pool by way of a transfer canal 62 that extends through the containment would not be practical with this type of containment and compact design. Furthermore, because the compact design practices in-vessel retention, it requires top mounted instrumentation which cannot practically exit the reactor vessel through the vessel head. Since the in-core instruments, which are traditionally used to measure core power and/or core exit temperatures need to be withdrawn from the fuel assemblies before refueling can begin, an innovative design is required that will permit the signal leads from the in-core instrumentation to exit the reactor through a penetration flange such as that described in U.S. patent application Ser. No. 13/457,678, filed Apr. 27, 2012, entitled "Instrumentation and Control Penetration Flange for Pressurized Water Reactor," while enabling the in-core instrumentation to be removed from the core before the upper internals package above the core is removed from the reactor vessel. For efficiency and to reduce radiation exposure, the instrumentation and control penetration flange structure is preferably removed as an integral part of the upper internals package. A further understanding of the operation of the small modular reactor illustrated in FIGS. 3 and 4 can be found in U.S. patent application Ser. No. 13/495, 050, filed Jun. 13, 2012, entitled "Pressurized Water Reactor Compact Steam Generator."

Figure 6:
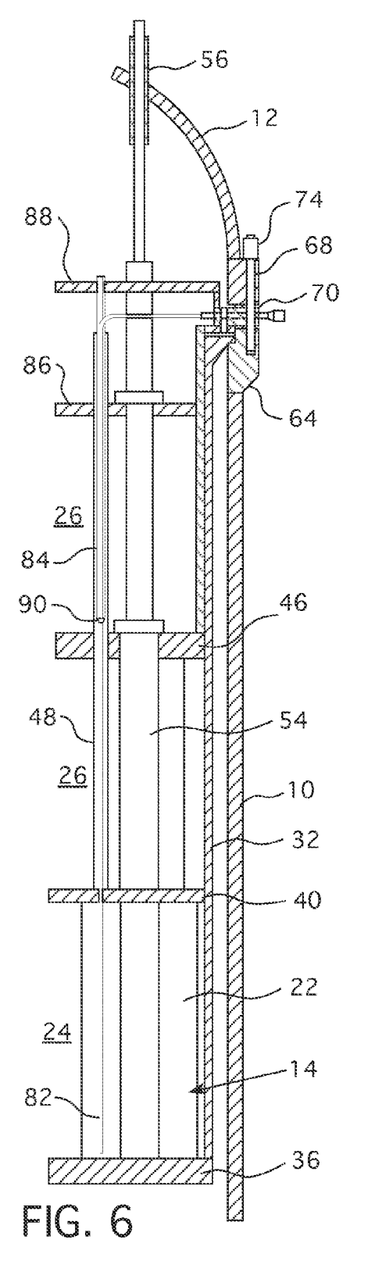
FIG. 6 is a partial schematic cross sectional view showing a portion of the interior of a conventional pressurized water reactor having top mounted instrumentation to which this invention is applied.

The apparatus and method of the embodiments of this invention claimed hereafter require the introduction of a penetration flange 66 between the reactor vessel flange 64 and the reactor head flange 68 as shown for a traditional pressurized water reactor in FIG. 6. This may be an additional penetration as to that required in certain small reactor designs as described in U.S. patent application Ser. No. 13/457,683, cited above, with one flange substantially dedicated to control rod drive mechanism power and the other flange serving the in-core instrumentation. In the case of the traditional pressurized water reactor, a single penetration flange 66 would be required as illustrated in FIG. 6. As previously described, the in-core instruments which are traditionally used to measure core power and/or core exit temperatures need to be withdrawn from the fuel assemblies before refueling can begin. The instrument is housed within a thimble tube with connected cabling that extends from the penetration flange to the fuel assembly. This thimble tube forms the primary pressure boundary and protects the instrument from the reactor coolant.

Figure 5:
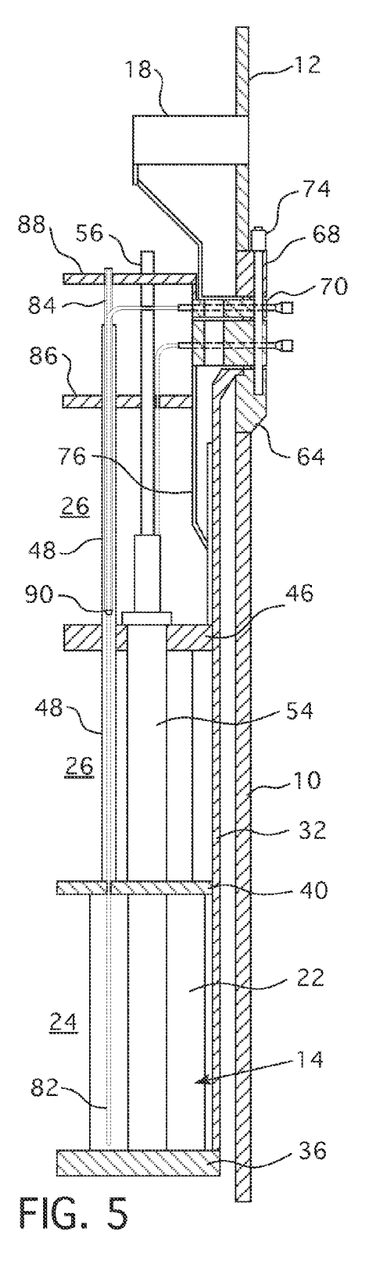
FIG. 5 is a partial schematic cross sectional view of an integrated pressurized water reactor with internal control rod drive mechanisms to which this invention is applied.
Figures 7, 8:
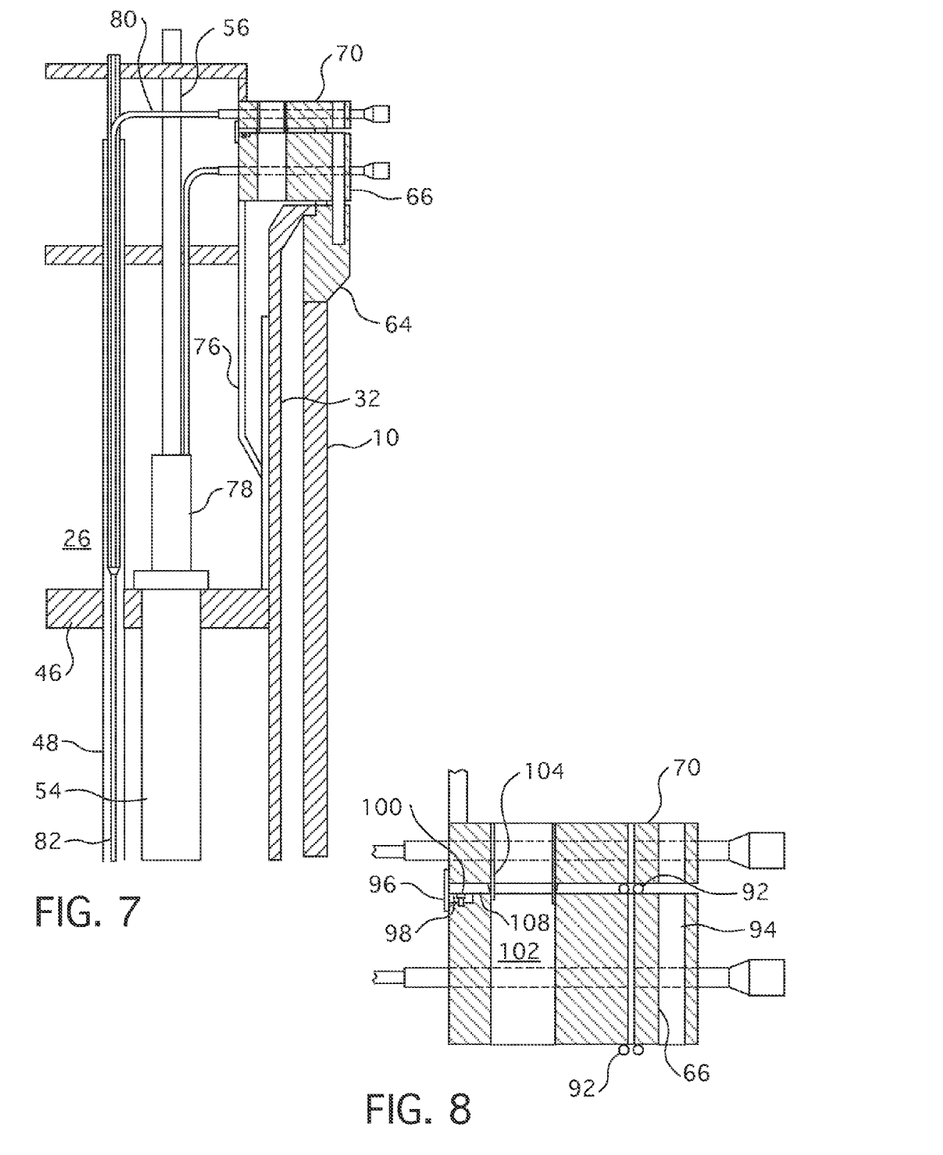
FIG. 7 is an enlarged view of a portion of the upper internals package shown in FIG. 5.
FIG. 8 is an enlarged view of the reactor vessel penetration seal shown in FIG. 7.

FIG. 7 shows an enlarged view of a portion of the upper internals package for the integral pressurized water reactor shown in FIG. 5. A further enlarged view of a cross-section of the upper and lower penetration flanges 70 and 66 is shown in FIG. 8. The lower penetration flange 66 in the integrated pressurized water reactor configuration is shown extending between the outer wall of the reactor vessel 10 and an inner wall 76 extending up vertically from the upper support assembly 46. The flange 66 carries the connector and electrical conduits through which the control rod drive system 78 is powered, the upper penetration flange 70 carries the connector and electrical conduit through which the in-core instrumentation cabling signals 80 are conveyed. During refueling, after removal of the closure head 12, but prior to the removal of the upper internals 26, the upper penetration flange 70 is raised. The instrument thimble 82 which extends down into the fuel assembly 22 is supported within the upper internals 26. Just above the core 14, the core support columns 48 have a central passage drilled axially through their center which provides the conduit for the instrument thimble's passage into the core. Above the upper support plate 46 a tube 84 is aligned with the central passage through the support column 48. The tube 84 is supported within the structure 86 of the upper internals 26. The columns 48 support the in-core instruments and prevent them from buckling while the penetration flange 70 is being lowered during reactor reassembly after refueling. The instrumentation tube 84 is connected to and supported by a grid structure 88 that is connected to the upper penetration flange 70 and is raised and lowered with the upper penetration flange. The tubes 84 slide inside the support columns 48 maintaining alignment of the two assemblies as the penetration flange 70 is being raised or lowered. The columns 48 and the tubes 84 maintain a relatively loose clearance until the penetration flange 70 is in its lowest position. At this point, narrowed sections 90 of the instrument tube 84 engage thickened sections that narrow the passage of the column 48 to provide a tighter fit. The tubes 84 in columns 48 remain engaged through the full range of motion of the in-core instrument penetration flange 70, as can be appreciated from FIGS. 5, 6 and 7 for an integral pressurized water reactor design. Preferably, the lower penetration flange 66 that carries the power cables to the control rod drive mechanism 78 remains stationary, being fixedly attached to a vertical section 76 of the upper support assembly 46, while the upper penetration flange 70 is raised. However, it should be appreciated that, alternately, the lower penetration flange 66 can be attached to the upper penetration flange 70 or the two penetration flanges can be constructed as a single unit and raised or lowered together. However, the latter arrangement is less desirable, because it would require considerable slack in the power cables to the control rod drive mechanisms which would have to be accommodated.

Figure 9:
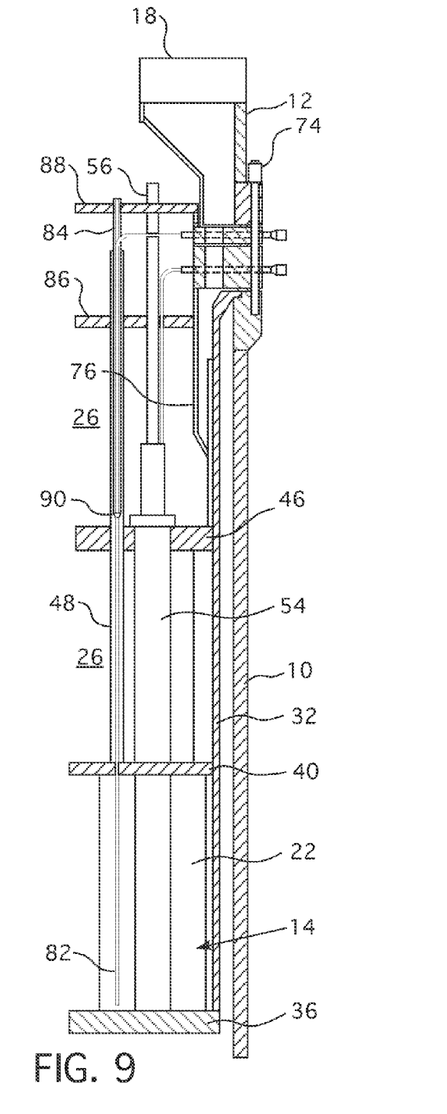
FIGS. 9, 10, 11, 12 and 13 are schematic partial cross sectional views, starting with the view shown in FIG. 5, of one embodiment of an upper internals package constructed in accordance with this invention, illustrating the steps of the method of one embodiment of this invention for disassembling and removing the upper internals package from the reactor vessel to access the fuel assemblies for refueling.
Figure 10:
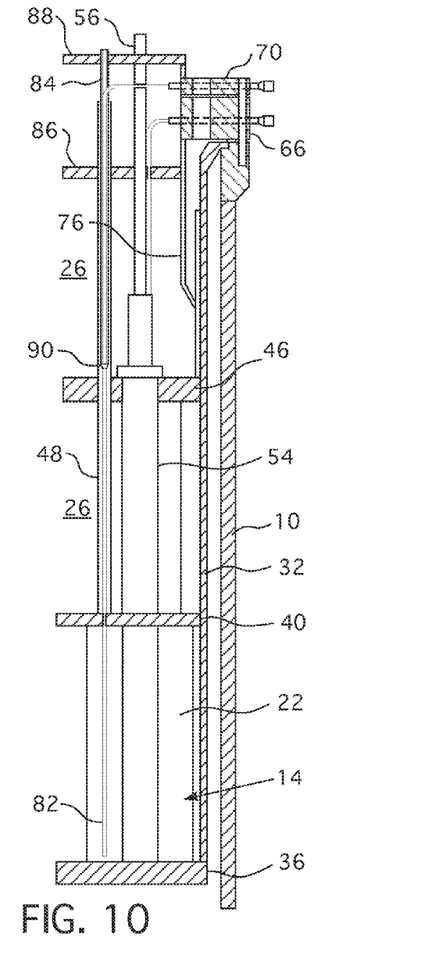
Figure 11:
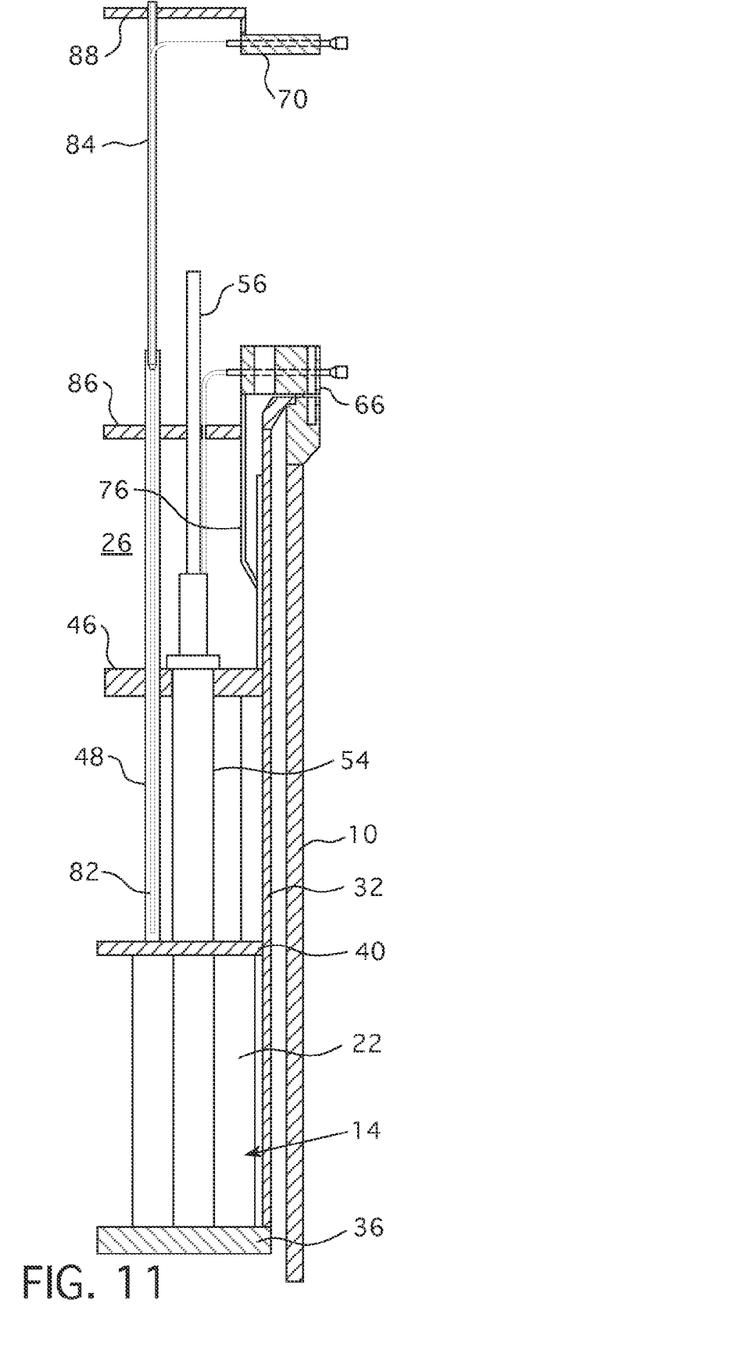
Figure 12:
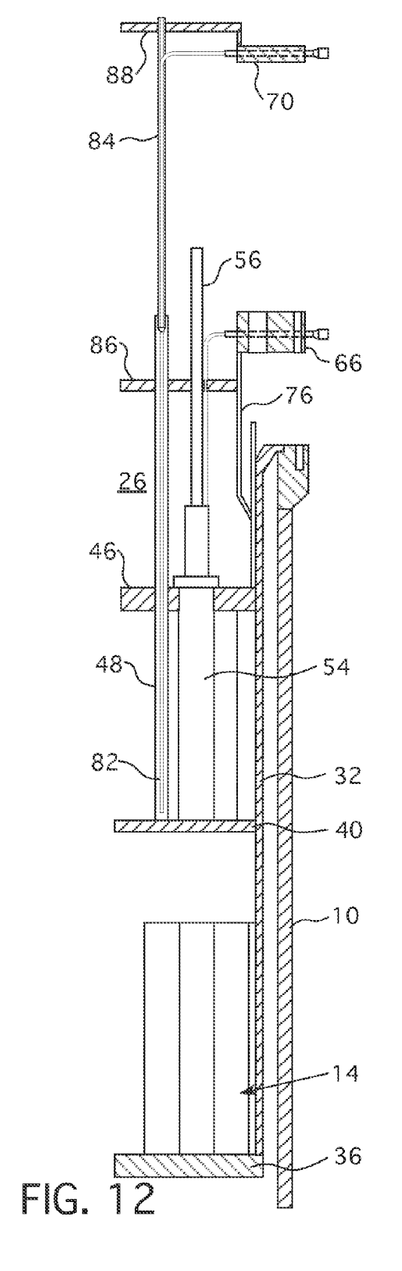
Figure 13:
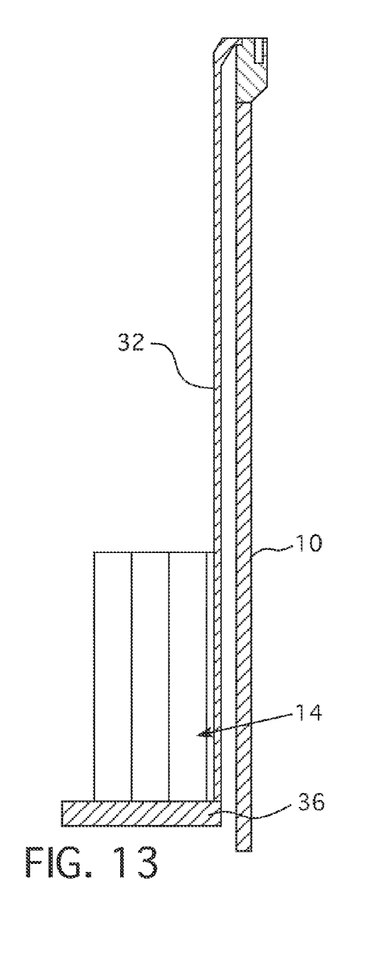

FIGS. 9, 10, 11, 12 and 13 show the disassembly sequence for the integrated pressurized water reactor shown in FIG. 5. FIG. 9 shows the reactor fully assembled with the vessel head 12 sealed to the vessel 10 with the flange bolts 74 in place and the instrument thimble 82 fully inserted into the core. It should be noted that the upper internals design illustrated in FIGS. 5-18 differs slightly from that previously illustrated in FIG. 2 in that the design shown in FIGS. 5-18 includes an extended upper internals package that extends the support columns 48 and, in the conventional pressurized water reactor design, the guide tubes 54 between the upper support plate 46 and an upper support assembly support structure 86. FIG. 10 shows the first stage in the reactor disassembly process for an integral pressurized water reactor design in which the head 12 including the steam generator 18 is removed. FIG. 11 shows the upper penetration flange being raised which retracts the in-core instrumentation thimble 82 from the fuel assemblies 22. FIG. 12 shows the upper internals being raised and FIG. 13 shows the reactor vessel with the upper internals completely removed.

Figure 14:
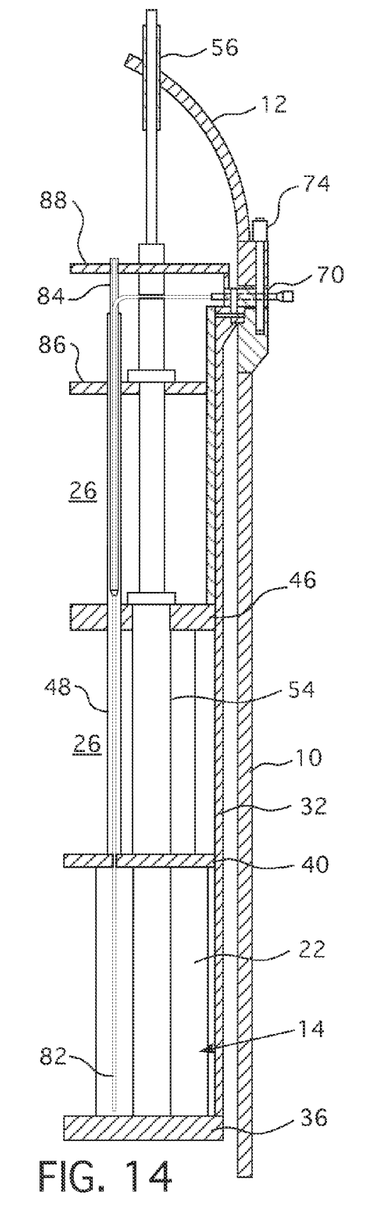
FIGS. 14, 15, 16, 17 and 18 show a corresponding apparatus and method of another embodiment of this invention as applied to a traditional pressurized water reactor design.
Figure 15:
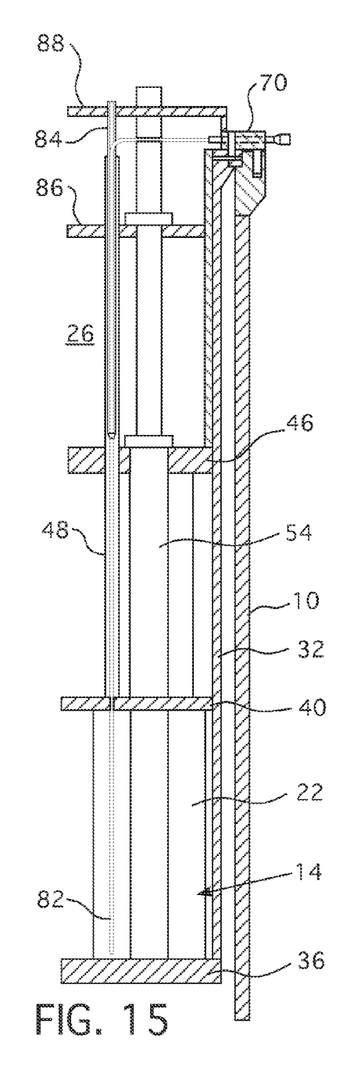
Figure 16:
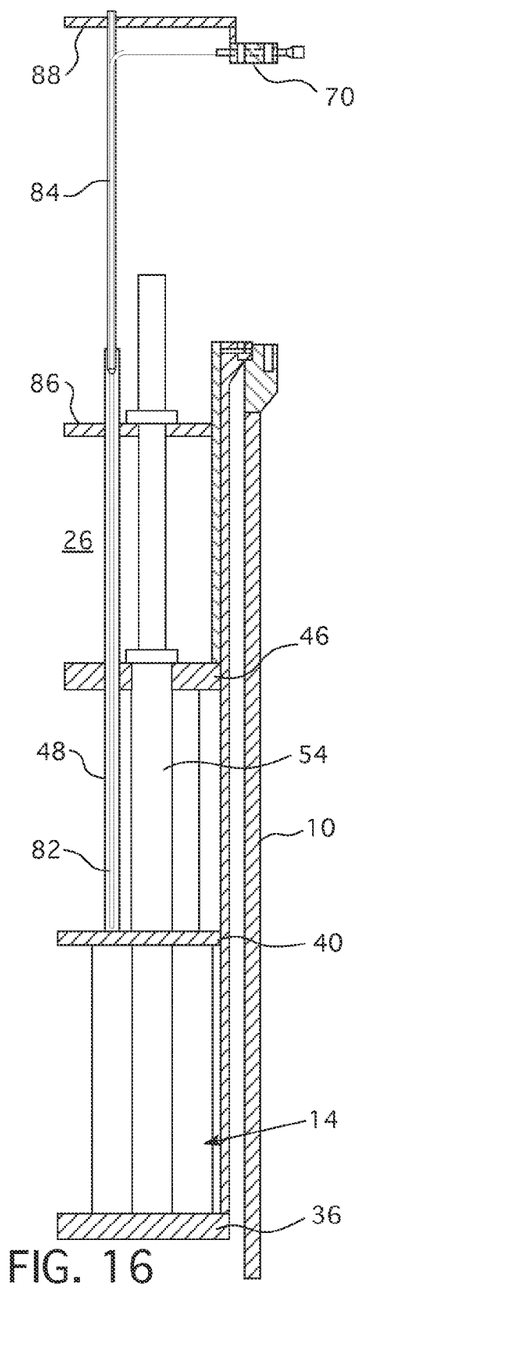
Figure 17:
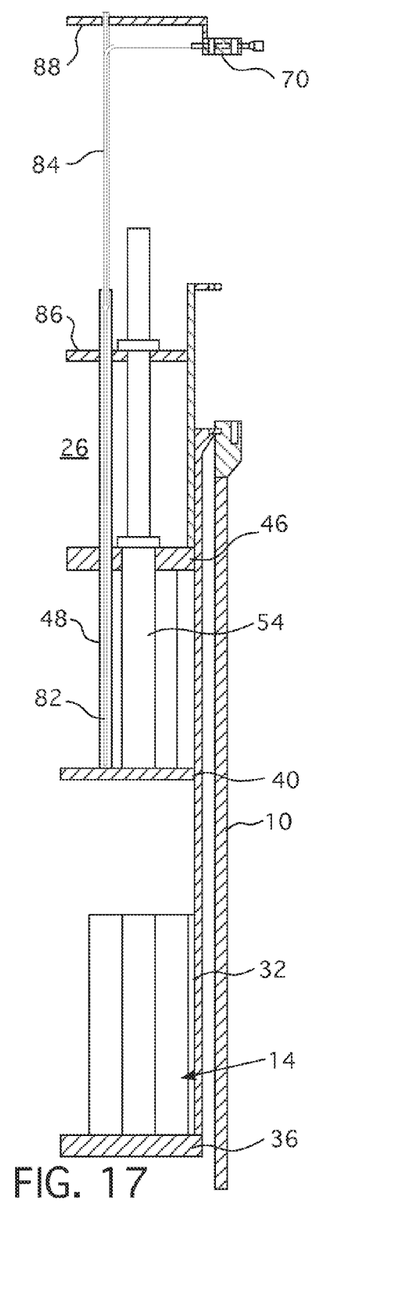
Figure 18:
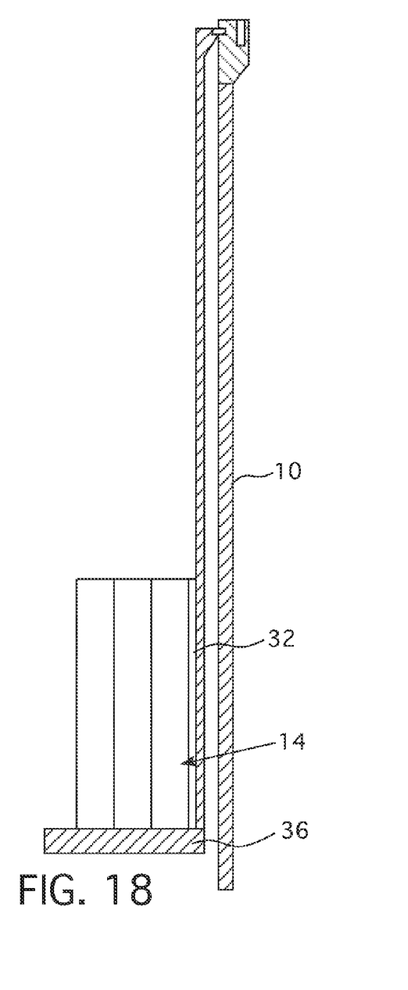

FIGS. 14, 15, 16, 17 and 18 show the corresponding sequence for the disassembly of a modified conventional pressurized water reactor design. In a pressurized water reactor design, the control rod drive mechanism drive rod travel housing 56 extends through the reactor head 12 and the drive mechanism is positioned above the head so that the control rod mechanism cabling is never within the reactor vessel. As is currently practiced, in refueling conventional pressurized water reactors, the control rod drive rods are disconnected from the spider assembly at the hub before the head 12 is removed and the drive rods are removed with the head. FIG. 14 is a duplicate of FIG. 6 showing the pressurized water reactor design fully assembled with the head secured by the flange bolts 74. FIG. 15 shows the head 12 removed with the control rod drive rods. FIG. 16 shows the upper penetration flange 70 (though, in this configuration there is no lower penetration flange) raised and the in-core instrumentation thimble 82 retracted from the core 14. FIG. 17 shows the upper internals partially removed and FIG. 18 shows the internals completely removed and moved off to a storage location. The assembly of the reactor after refueling is simply the reverse of the process just described. During reassembly of the reactor vessel, the internals are placed in the vessel above the core then the penetration flange is lowered until it makes contact with the reactor vessel flange.

The primary pressure boundary seal between each of the flanges, i.e., the head flange 68, the upper penetration flange 70, the lower penetration flange 66 and the reactor vessel flange 64, is maintained with a pair of O-rings 92 with leak-off lines 94 used to monitor the seal. Each flange connection uses a pair of O-rings 92. A hole 94 through the flange can be used to connect the voids between the pairs of O-rings 92 allowing for a single set of leak-off lines to be used. These lines would connect to the leak-off lines of the reactor vessel flange 64 which drain into a common leak-off reservoir (not shown) so that they can remain connected to the plant leak-off monitoring systems during refueling.

As described above, in the case of an integral pressurized water reactor, two flanges 66 and 70 may be used to introduce penetrations through the reactor pressure boundary. In some designs, a potential for core by-pass flow between the main coolant return passage 102 and the upper internals exists through an inner gap 108 between the flanges 66 and 70. The preferred embodiment for this configuration includes a sealing device 96 that takes advantage of the difference in the rate of thermal expansion for carbon and stainless steels. The device is a ring which has a "T" shaped cross section and is attached to one of the flanges. The device 96 is fastened through the web 98 of the "T" with threaded fasteners 100. The clearance hole through the web is slotted to allow for the ring to expand during reactor heat-up. During reactor assembly there is a generous clearance between the seal and the flanges. As the plant heats up, the stainless steel ring expands faster than the reactor flanges, creating pressure between the components and providing the required seal. The pressure differential is relatively low with an example range of 10 to 20 psi (69 to 138 kPa). An extended sleeve 104 attached to one of the flanges may also limit bypass flow and reduce the pressure drop as primary coolant passes through the flanges in the primary fluid flow channel 102.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of refueling a nuclear reactor comprising:
   an elongated reactor vessel enclosed at a lower end and having an open upper end on which an annular flange is formed and a central axis extending along an elongated dimension;
   a reactor vessel head having an annular portion on an underside of the head that is machined to form a sealing surface;
   a first removable annular seal ring, sized to seat on the reactor vessel flange between the flange and the sealing surface on the underside of the reactor vessel head, the seal ring being interposed between the sealing surface on the underside of the vessel head and the flange on the reactor vessel and having a thickness sized to sealably accommodate one or more radial passages through which one or more instrument conduits pass from outside of the reactor vessel to an interior thereof to communicate instrumentation signals out of a core of the nuclear reactor, the core comprising a plurality of fuel assemblies;
   an upper internals package supported above the core within the reactor vessel and having a plurality of hollow support columns respectively having a substantially vertical passage therethrough, that extends through and between an upper core plate and an upper support plate of the upper internals package, the passage through the upper core plate being aligned with a corresponding instrument thimble within one of the fuel assemblies; and
   a plurality of hollow tubes fixedly connected to the first removable annular seal ring, each of the hollow tubes being slidably mounted within the passage of one of the support columns with at least one of the instrument conduits extending axially through the hollow tube into the corresponding support column, the hollow tube being slidable within the support column between a fully inserted position and a fully extended position wherein in the fully inserted position the instrument conduit enters the instrument thimble and in the fully extended position the instrument conduit is withdrawn from the core;
   the method comprising the steps of:
      removing the reactor vessel head from the first removable annular seal ring;
      raising the first removable annular seal ring to an elevation that withdraws the instrument conduit from the core;
      withdrawing the upper internals package, including the first removable annular seal ring in the raised position, as a single unit, out of the reactor vessel to a storage location; and
      refueling the core.

2. The method of claim 1 wherein the method of refueling the nuclear reactor after the refueling step includes the steps of:
   maintaining the first removable annular seal ring in the raised position;
   lowering the upper internals package into the reactor vessel;
   supporting the upper internals package above the core;
   lowering the first removable annular seal ring on top of the reactor vessel flange and simultaneously lowering the hollow tubes within the corresponding support columns to lower the instrument conduits into the corresponding instrument thimbles in the fuel assemblies; and
   replacing the reactor vessel head.

3. The method of claim 2 wherein the first removable annular seal ring extends radially between an approximate extent of an outer wall of the reactor vessel and a wall of the upper internals package, including a second removable annular seal ring positioned below the first removable annular seal ring between the first removable seal ring and the reactor vessel flange and having substantially the same radial extent as the first removable seal ring, the second removable annular seal ring is fixedly connected to the wall of the upper internals package wherein the step of withdrawing the upper internals package includes the step of removing the second removable annular seal ring from the reactor vessel flange as part of the upper internals package.

\* \* \* \* \*